United States Patent [19]
Schuster et al.

[11] Patent Number: 5,223,009
[45] Date of Patent: Jun. 29, 1993

[54] EXHAUST GAS EQUIPMENT FOR AN INTERNAL COMBUSTION ENGINE

[75] Inventors: Hans-Dieter Schuster, Schorndorf; Wolfgang Zahn, Ludwigsburg; Roland Huss, Esslingen, all of Fed. Rep. of Germany

[73] Assignee: Mercedes-Benz A.G., Fed. Rep. of Germany

[21] Appl. No.: 940,297

[22] Filed: Sep. 3, 1992

[30] Foreign Application Priority Data

Sep. 11, 1991 [DE] Fed. Rep. of Germany ....... 4130178

[51] Int. Cl.⁵ .............................................. B01D 53/04
[52] U.S. Cl. ........................................ 55/267; 55/312; 55/387; 55/418; 55/518; 55/DIG. 30
[58] Field of Search ................. 55/267, 387, 418, 495, 55/502, 505, 518, DIG. 30, 312

[56] References Cited

U.S. PATENT DOCUMENTS

| | | | |
|---|---|---|---|
| 1,756,758 | 4/1930 | Orem | 55/505 X |
| 2,077,563 | 4/1937 | Henry | 55/387 |
| 2,642,954 | 6/1953 | Le Valley | 55/518 X |
| 3,113,000 | 12/1963 | Gerhold | 55/418 X |
| 3,129,078 | 4/1964 | Hobbs | 55/418 X |
| 3,224,171 | 12/1965 | Bowman | 55/DIG. 30 |
| 3,593,498 | 7/1971 | Semon | 55/387 X |
| 3,738,089 | 6/1973 | Brill | 55/DIG. 30 |
| 3,811,845 | 5/1974 | Nakamura | 55/DIG. 30 |
| 4,124,357 | 11/1978 | Akimoto et al. | 55/DIG. 30 |
| 4,149,862 | 4/1979 | Sewell, Sr. | 55/387 X |
| 4,318,720 | 3/1982 | Hoggatt | 55/DIG. 30 |
| 4,829,766 | 5/1989 | Henkel | 55/DIG. 30 |
| 4,894,074 | 1/1990 | Mizrah et al. | 55/DIG. 30 |
| 4,913,712 | 4/1990 | Gabathuler et al. | 55/DIG. 30 |
| 4,969,328 | 11/1990 | Kammel | 55/DIG. 30 |
| 4,999,998 | 3/1991 | Akerib | 55/DIG. 30 |

FOREIGN PATENT DOCUMENTS

| | | |
|---|---|---|
| 2856725 | 1/1978 | Fed. Rep. of Germany .... 55/DIG. 30 |
| 3910554 | 10/1989 | Fed. Rep. of Germany ........ 55/495 |
| 62-162715 | 7/1987 | Japan. |

*Primary Examiner*—Robert Spitzer
*Attorney, Agent, or Firm*—Evenson, McKeown, Edwards & Lenanhan

[57] ABSTRACT

The exhaust gas equipment for an internal combustion engine contains an exhaust pipe, an exhaust gas cleaner and an adsorption filter, to whose filter body exhaust gas is admitted by a controlled exhaust gas butterfly. In order to prevent damage to the filter due to overheating, in an arrangement of the exhaust gas equipment which is economical in installation space where the adsorption filter is located along the course of the exhaust pipe and a filter body surrounds the latter coaxially, a thermal insulation element is provided between the filter body and exhaust gas flow. The thermal insulation element has transfer openings at least partially outside the exhaust pipe section surrounded by the filter body for guiding the exhaust gas flow through the filter body.

5 Claims, 1 Drawing Sheet

EXHAUST GAS EQUIPMENT FOR AN INTERNAL COMBUSTION ENGINE

BACKGROUND AND SUMMARY OF THE INVENTION

This invention relates to exhaust gas equipment and, more particularly, exhaust gas equipment for an internal combustion engine having an exhaust pipe, an exhaust gas cleaner located in the exhaust pipe and having an adsorption filter. Exhaust gas is admitted to the filter body under the control of an exhaust gas butterfly.

Exhaust gas equipment of the generic type is known from Japanese patent document JP 62-162715. In the exhaust gas equipment described in that reference, an auxiliary pipe branched off from an exhaust pipe contains an adsorption filter which has flow directed to it in the cold starting phase of the internal combustion engine. The flow is directed to it by deflecting the exhaust gas by means of an exhaust gas butterfly located in the branch of the exhaust pipe. After the catalyzer has taken up its function, the exhaust gas flow is substantially guided through the exhaust pipe by controlling the butterfly and, particularly in full-load operation, this exhaust pipe becomes very hot. In the case of small installation spaces, three-dimensionally extensive auxiliary pipes are difficult to achieve so that the adsorption filter and the exhaust pipe are located close together. Because of this, however, the adsorption filter can rapidly become overheated and therefore damaged.

There is therefore needed exhaust gas equipment of the generic type developed in such a way that damage to the filter due to overheating is avoided in an arrangement which is economical in installation space.

This need is met according to the present invention by exhaust gas equipment for an engine having an exhaust pipe, an exhaust gas cleaner located in the exhaust pipe and having an adsorption filter. Exhaust gas is admitted to the filter body under the control of an exhaust gas butterfly. The adsorption filter is located along the course of the exhaust pipe with a filter body surrounding the exhaust pipe coaxially. A thermal insulation element is provided between the filter body and the exhaust gas flow. For guiding the exhaust gas flow through the filter body, the thermal insulation element has transfer openings at least partially outside the exhaust pipe section surrounded by the filter body.

The adsorption filter is located along the course of the exhaust pipe and its filter body surrounds the latter coaxially. It therefore presents a very compact configuration which is economical in installation space. In order to protect the filter body from overheating, a thermal insulation element is provided between the filter body and the exhaust gas flow. For guiding the exhaust gas flow through the filter body, the thermal insulation element has transfer openings at least partially outside the exhaust pipe section surrounded by the filter body. The thermal insulation element is then intended to possess the property of attenuating the high temperature effect of the exhaust gas on the filter body to the extent that although the latter is heated, damaging temperatures are not reached. This has the advantage that at the end of the cold starting phase, the filter body already possesses a sufficiently high temperature for the pollutants absorbed by the filter body to evaporate so that the regeneration period of the adsorption filter is shortened.

In an advantageous embodiment of the invention, the thermal insulation element is designed as a thermal insulation tube. Large-area thermal contact between the exhaust gas flow and the filter body is achieved by means of the large area of the thermal insulation tube so that rapid and even heating of the filter body and, in consequence, particularly good regeneration of the adsorption filter, is achieved.

Other objects, advantages and novel features of the present invention will become apparent from the following detailed description of the invention when considered in conjunction with the accompanying drawings.

BRIEF DESCRIPTION OF THE DRAWINGS

The sole

DETAILED DESCRIPTION OF THE DRAWINGS

Figure 1:
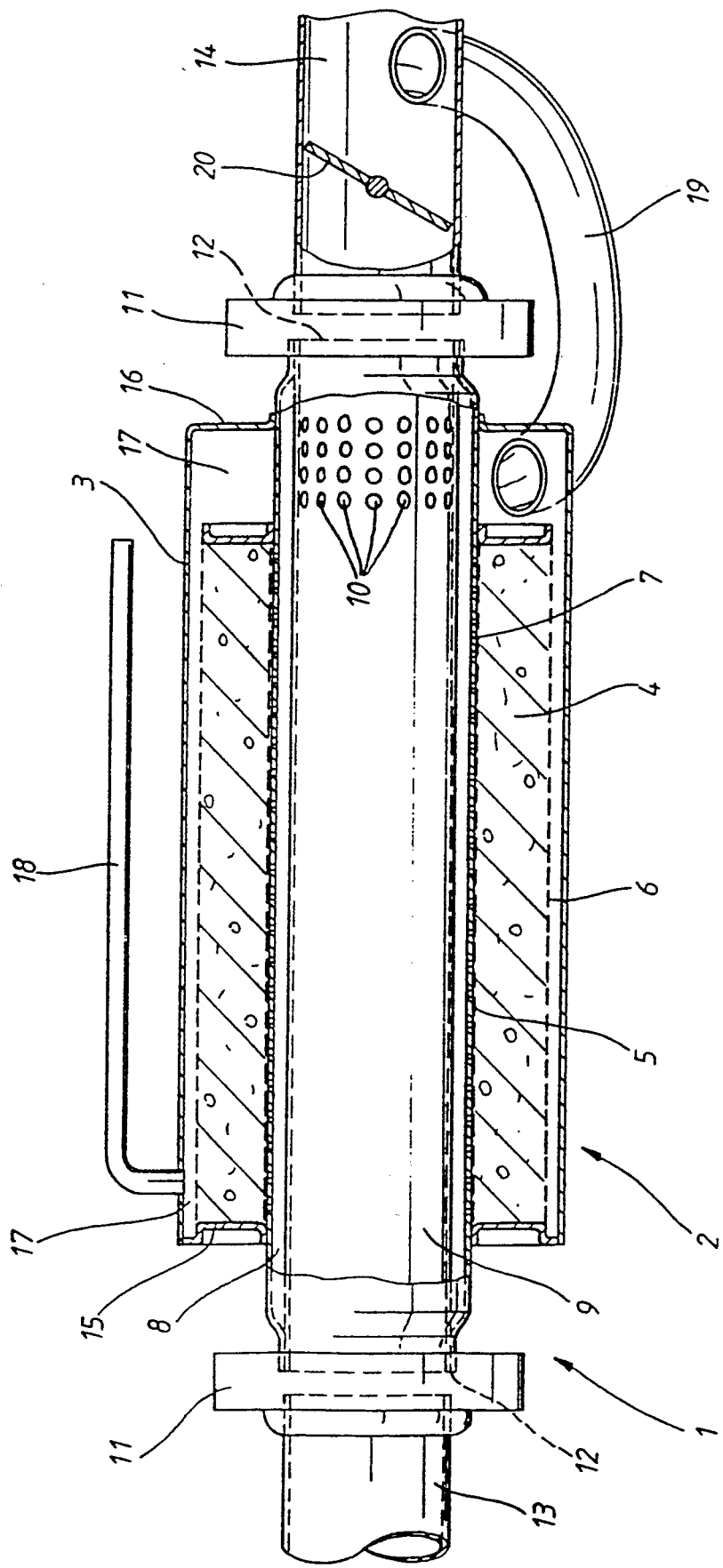
FIG. 1 is a longitudinal section view of an embodiment example of the invention showing an exhaust pipe section with an adsorption filter and a thermal insulation tube.

In FIG. 1, a section of an exhaust pipe 1 is shown. An adsorption filter 2 is provided along the course of the exhaust pipe 1. The adsorption filter 2 consists of a hollow cylindrical filter casing 3 which, together with a hollow cylindrical filter body 4 accommodated within it, coaxially surrounds the exhaust pipe 1. The filter body 4 can, for example, consist of fine-grained active carbon which is enclosed, for strength reasons, by fine-mesh wire nets 5, 6 at the inner periphery and outer periphery of the filter body 4, respectively. The filter body 4 is held on the inner periphery of a support tube 7 which is perforated along the filter body 4. The support body 7 surrounds, at a distance and so as to form an inlet-end annular space 8, a thermal insulation tube 9 which has transfer openings 10, to the annular space 8, distributed around its periphery downstream of the exhaust gas pipe section surrounded by the filter material. The support tube 7 and the thermal insulation tube 9 are connected by connecting flanges 11 at their lengthwise ends 12. This makes it possible to install the adsorption filter 2 in a simple manner between exhaust gas supply and exhaust gas removal sections 13, 14 of the exhaust pipe 1. The thermal insulation tube 9 and the support tube 7 protrude through the ends 15, 16 of the filter casing 3 connected to the support tube 7. The filter casing 3, together with the outer periphery of the filter body 4, forms the boundary of an outlet-end annular extraction space 17 to which is connected, near the end surface 15, a return pipe 18 to an induction pipe of the internal combustion engine, not shown in any more detail. A bypass 19 branches off from the extraction space 17 between the end surface 16 of the filter casing 3 and the opposite end surface of the filter body 4. The bypass pipe 19 is connected to the exhaust pipe section 14 downstream of a controllable exhaust gas butterfly 20 located in the exhaust pipe section 14.

In the cold starting phase, the exhaust gas butterfly 20 is controlled in such a manner that the exhaust pipe 1 is closed in the exhaust pipe section 14. The exhaust gas flow, which is guided through the section 13 of the exhaust pipe and the thermal insulation tube 9 connected to it, is therefore deflected through the transfer openings 10 into the inlet-end annular space 8. The exhaust gas is admitted via the perforated region of the support tube 7 to the filter body 4 formed from active carbon. The active carbon filters out hydrocarbons from the exhaust gas which emerges, with the hydrocarbons removed, from the filter body 4 into the extraction space 17. Via the extraction space 17, a substantial proportion of the exhaust gas flows through the bypass pipe 19 into the section 14 of the exhaust pipe 1 downstream of the exhaust butterfly 20. After the end of the cold starting phase, the exhaust gas butterfly 20 opens the section 14 of the exhaust pipe 1 from a specified temperature so that the exhaust gas flows through the exhaust pipe 1 without being deflected through the adsorption filter 2. The active carbon, heated by the exhaust gas flow via the thermal insulation tube 9 during the cold starting phase, evaporates the hydrocarbons absorbed by it. These then emerge in the extraction space 17 and are induced for combustion, via the return pipe 18, by the induction pipe of the internal combustion engine.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Exhaust gas equipment for an internal combustion engine, comprising:
    an exhaust pipe having a course;
    an exhaust gas cleaner located in the exhaust pipe and having an adsorption filter, said adsorption filter having a filter body;
    an exhaust gas butterfly for controlling the admission of exhaust gas to said filter body;
    a thermal insulation element provided between said filter body and the exhaust gas flow;
    wherein said adsorption filter is located along the course of said exhaust pipe with said filter body coaxially surrounding the exhaust pipe; and
    further wherein said thermal insulation element has transfer openings disposed at least partially outside the section of the exhaust pipe surrounded by the filter body for guiding the exhaust gas flow through said filter body.

2. An exhaust pipe according to claim 1, wherein said thermal insulation element is a thermal insulation tube.

3. An exhaust pipe according to claim 2, wherein the filter body is designed as a hollow cylinder and is held on a perforated support tube which surrounds the thermal insulation tube and together with the thermal insulation tube bounds an inlet-end annular space.

4. An exhaust pipe according to claim 3, wherein an outlet-end extraction space formed between a filter casing and the filter body is connected via a bypass pipe to a section of the exhaust pipe extending downstream of the exhaust gas butterfly and via a return pipe to an induction pipe of the internal combustion engine.

5. An exhaust pipe according to claim 4, wherein the thermal insulation tube and the support tube are connected at their lengthwise ends to connecting flanges for purposes of installation in the exhaust pipe.

* * * * *